US009542437B2

(12) United States Patent
Stadter

(10) Patent No.: US 9,542,437 B2
(45) Date of Patent: Jan. 10, 2017

(54) LAYOUT-DRIVEN DATA SELECTION AND REPORTING

(75) Inventor: Ralph Stadter, Aglasterhausen (DE)

(73) Assignee: SAP SE, Walldorf (DE)

( * ) Notice: Subject to any disclaimer, the term of this patent is extended or adjusted under 35 U.S.C. 154(b) by 502 days.

(21) Appl. No.: 13/345,102

(22) Filed: Jan. 6, 2012

(65) Prior Publication Data

US 2013/0179435 A1 Jul. 11, 2013

(51) Int. Cl.
G06F 7/00 (2006.01)
G06F 17/30 (2006.01)
G06Q 10/00 (2012.01)

(52) U.S. Cl.
CPC ......... *G06F 17/30398* (2013.01); *G06Q 10/00* (2013.01)

(58) Field of Classification Search
USPC .................................................. 707/713–734
See application file for complete search history.

(56) References Cited

U.S. PATENT DOCUMENTS

| | | | | |
|---|---|---|---|---|
| 7,216,116 | B1* | 5/2007 | Nilsson | G06F 17/30398 |
| 2003/0167260 | A1* | 9/2003 | Nakamura et al. | 707/3 |
| 2005/0114763 | A1* | 5/2005 | Nonomura et al. | 715/513 |
| 2007/0011167 | A1* | 1/2007 | Krishnaprasad et al. | 707/9 |
| 2008/0010243 | A1* | 1/2008 | Weissman et al. | 707/2 |
| 2008/0162446 | A1* | 7/2008 | Dettinger | G06F 17/30427 |
| 2009/0055354 | A1* | 2/2009 | Arad | G06F 17/30864 |
| 2009/0222414 | A1* | 9/2009 | Mattox et al. | 707/3 |
| 2010/0257144 | A1* | 10/2010 | Lambert et al. | 707/689 |
| 2010/0274759 | A1* | 10/2010 | Takeuchi et al. | 707/624 |
| 2010/0274795 | A1* | 10/2010 | Rallapalli et al. | 707/769 |
| 2011/0047146 | A1* | 2/2011 | Scott | 707/722 |
| 2011/0167057 | A1* | 7/2011 | Lamm | 707/722 |
| 2011/0271179 | A1* | 11/2011 | Jasko et al. | 715/256 |
| 2012/0030166 | A1* | 2/2012 | Mohr et al. | 707/610 |
| 2012/0117102 | A1* | 5/2012 | Meyerzon et al. | 707/767 |
| 2012/0191732 | A1* | 7/2012 | George | 707/755 |

OTHER PUBLICATIONS

Microsoft Computer Dictionary, 210-11, 442-43 (5th ed. 2002).*
"Microsoft Computer Dictionary 210-11 (MCD), 5th edition", (2002), 442-443.

* cited by examiner

*Primary Examiner* — Tuan A Pham
(74) *Attorney, Agent, or Firm* — Schwegman Lundberg & Woessner, P.A.

(57) ABSTRACT

A system includes a database with a plurality of records, each record including a plurality of data fields. The system receives input from an end user. The end user input is received via an end user interface, and the end user input includes a subset of the plurality of data fields. The system queries the database using the subset of data fields, and data is retrieved from the database using the subset of data fields. The data retrieved from the database substantially include only data fields that are the data fields supplied by the end user. In an embodiment, the retrieved data do not include data fields that are not part of the data fields supplied by the end user.

19 Claims, 7 Drawing Sheets

| Ye... | Ld | CoCode | Account | Cr... | Σ Amount in TC |
|---|---|---|---|---|---|
| 2011 | 0L | 0005 | 113100 | EUR | 60.000,00 |
|  |  |  | 113101 |  | 60.000,00- |
|  |  | 0005 |  |  | 0,00 |
|  |  |  | 1000 |  | 31.234.368,00 |
|  |  |  | 1010 |  | 13.945.717,70- |
|  |  |  | 11000 |  | 85.673.464,00 |
|  |  |  | 11010 |  | 93.803.369,76- |
|  |  |  | 21000 |  | 311.109.120,00 |
|  |  |  | 21010 |  | 115.311.879,19- |
|  |  |  | 32000 |  | 0,00 |
|  |  |  | 113100 |  | 360.000,00 |
|  |  |  | 113103 |  | 77.692,03- |
|  |  |  | 140000 |  | 629.635,04 |
|  |  |  | 154000 |  | 136.698,69 |
|  |  |  | 160000 |  | 799.049,08- |
|  |  |  | 172170 |  | 60,22- |
|  |  |  | 175000 |  | 68.829,54- |
|  |  |  | 176000 |  | 949.533,02- |
|  |  |  | 176100 |  | 1.428.103,59- |
|  |  |  | 176200 |  | 668.268,99- |
|  |  |  | 176400 |  | 9.052,39- |

| Layout | Layout Description |
|---|---|
| /0TSTART | Start |
| /1PERIOD | Account Blalances per Period |
| /2MORE DET | More Details |
| ZDOC | Document numbers |

*FIG. 3*

| Ye... | Ld | CoCode | Account | Pe... | Cr... | Σ Amount in TC |
|---|---|---|---|---|---|---|
| 2011 | 0L | 0005 | 113100 | 12 | EUR | 60.000,00 |
| | | | 113101 | | | 60.000,00- |
| | | 0005 | | | | 0,00 |
| | | 1000 | 1000 | 1 | | 31.234.368,00 |
| | | | | 7 | | 1.000,00 |
| | | | 1010 | 1 | | 112.999.73- |
| | | | | 2 | | 13.832.717,97- |
| | | | 11000 | 4 | | 23.827.008,00 |
| | | | | 5 | | 61.851.456,00 |
| | | | | 8 | | 5.000,00- |
| | | | 11010 | 1 | | 110.856,00- |
| | | | | 2 | | 93.692.680,42- |
| | | | | 8 | | 166,66 |
| | | | 21000 | 1 | | 64.197.120,00 |
| | | | | 2 | | 123.456.000,00 |
| | | | | 3 | | 123.456.000,00 |
| | | | 21010 | 2 | | 115.311.879,19- |
| | | | 32000 | 1 | | 1,25- |
| | | | | 2 | | 1,25 |
| | | | 113100 | 1 | | 30.000,00- |
| | | | | 2 | | 30.000,00- |

| Layout | Layout Description |
|---|---|
| /0TSTART | Start |
| /1PERIOD | Account Blalances per Period |
| /2MORE DET | More Details |
| /Z DOC | Document numbers |

510 — Displayed Columns Σ

| Column Name | |
|---|---|
| Fiscal Year | |
| Ledger | |
| Company Code | |
| Account Number | |
| Posting Period | |
| Transaction Currency | |
| Amount in Trans. Crcy | ☑ |
| Profit Center | |
| Amount in Local Crcy | ☑ |

520 — Columns Available for Display

| Column Name |
|---|
| Amount in Gross |
| Amount in Arrows |
| Quantity |
| Amount in Order |
| Debit/Credit |
| Fiscal Year |
| Posting date |
| Document Number |
| Line Item |
| Posting Key |
| Doc. Status |
| Item Category |
| Changed (Document) |

500 / 530 / 540

| Ye... | Ld | CoCode | Account | Pe... | Cr... Σ | Amount in TC | Profit Ctr Σ | LC Ar |
|---|---|---|---|---|---|---|---|---|
| 2011 | | | | 12 | EUR | 60.000,00 | ADMIN | 60.000,00 |
| | 0L | 0005 | 113100 | | | 60.000,00 | ADMIN | 60.000,00- |
| | | 0005 | 113101 | | | 0,00 | | 0,00 |
| | | 1000 | 1000 | | | 31.234.368,00 | | 31.234.368,00 |
| | | | | 7 | | 1.000,00 | | 1.000,00 |
| | | | 1010 | 1 | | 41.667,00- | 9990 | 41.667,00- |
| | | | | | | 25.565,00- | 1480 | 25.565,00- |
| | | | | | | 3.660,11- | 1500 | 3.660,11- |
| | | | | | | 7.171,00- | 1400 | 7.171,00- |
| | | | | | | 2.105,68- | 1100 | 2.105,68- |
| | | | | | | 7.913,58- | 1000 | 7.913,58- |
| | | | | | | 852,22- | 1300 | 852,22- |
| | | | | | | 14.134,10- | 1010 | 14.134,10- |
| | | | | | | 9.931,04- | 1402 | 9.931,04- |
| | | | | 2 | | 7.170,62- | 1400 | 7.170,62- |
| | | | | | | 25.564,18- | 1480 | 25.564,18- |
| | | | | | | 41.666,33- | 9990 | 41.666,33- |
| | | | | | | 3.660,64- | 1500 | 3.660,64- |
| | | | | | | 2.103,96- | 1100 | 2.103,96- |
| | | | | | | 7.915,15- | 1000 | 7.915,15- |

LAYOUT-DRIVEN DATA SELECTION AND REPORTING

TECHNICAL FIELD

The present disclosure relates to systems and methods that permit an end user to extract data from a database, and in an embodiment, but not by way of limitation, a system and method that permit an end user to predominantly extract only the data from a database as determined by the end user.

BACKGROUND

Traditional end user database reporting methods read a great deal of detailed information and then display only a portion of that detailed information (i.e., the fields in the report output and not all the data read from the database) at a high level of detail (i.e., a great deal of data records without aggregation). This is the case even though oftentimes an end user is interested in an aggregated view (e.g., totals grouped by specific dimensions). This traditional approach consumes a lot of resources. For example, many irrelevant details are read from the database, a vast amount of resources is allocated for many rows and many columns, and there are long response times. That is, a good amount of time is spent in the database reading irrelevant information, which is not displayed. And even if only the fields to be displayed are read from the database, oftentimes the structure used for working with the information read from the database is made up of all the data fields of a record, the reading of which results in an unnecessary allocation of memory.

BRIEF DESCRIPTION OF THE DRAWINGS

FIG. 3 is an example of an end user data report.

FIG. 4 is another example of an end user data report.

FIG. 5 is yet another example of an end user data report.

DETAILED DESCRIPTION

Figure 1A:
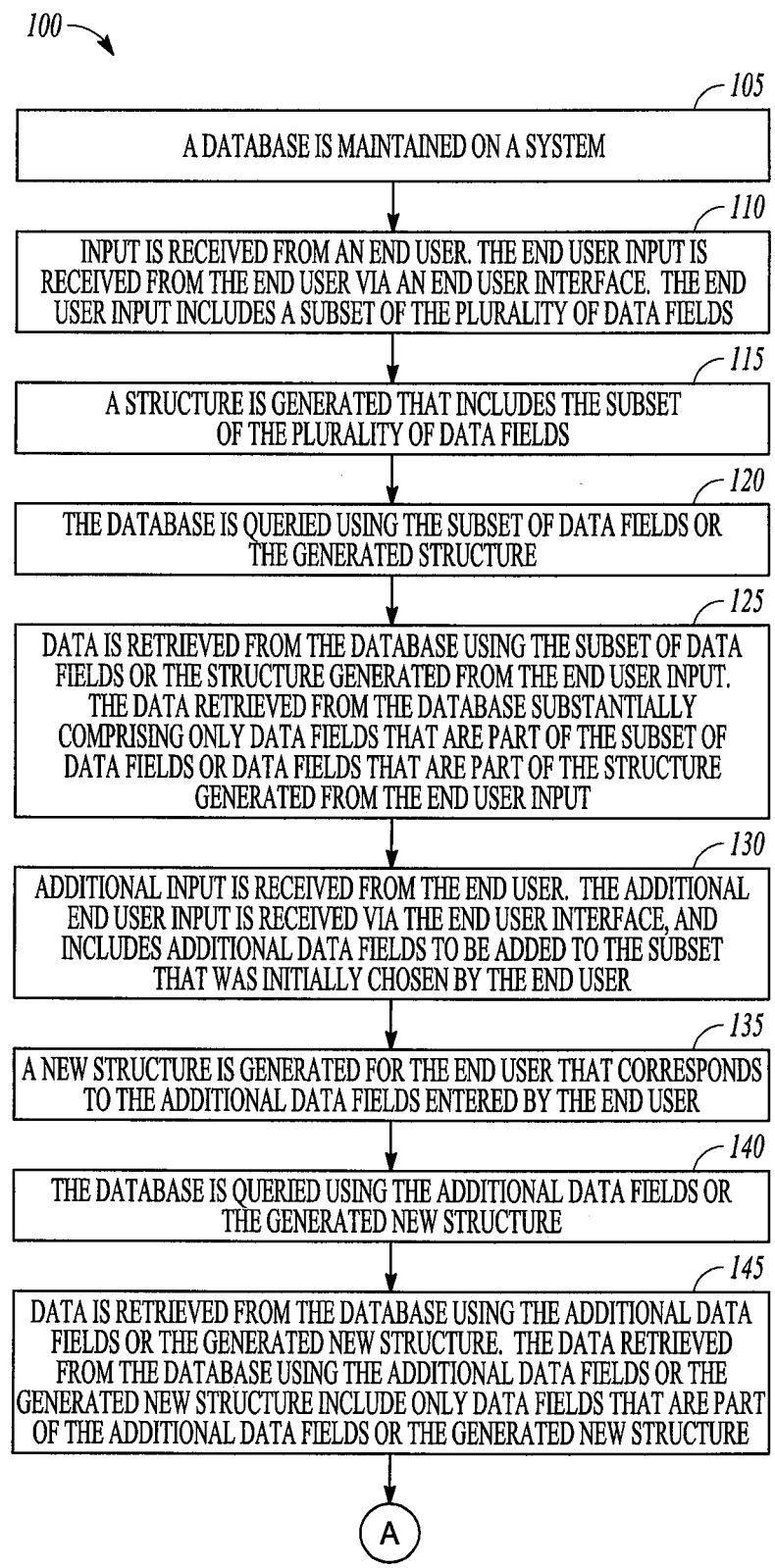
FIGS. 1A and 1B are a block diagram of the features of a system and process for layout driven data selection in end user data reporting.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

An in-memory database, such as SAP's HANA database, allows for increased speeds when processing data. An in-memory database is not resident on disc, but read into memory and maintained in memory. Processing data in memory is exponentially faster than having to retrieve the data from disc before processing it. Consequently, the use of an in-memory database increases data processing speeds, thereby greatly decreasing the time that it takes to process data and/or generate reports. Additionally, the in-memory database may store data in a column-store, thereby providing advantages in data compression and fast aggregation of vast volumes of data.

Such in-memory databases offer enormous potential for novel end user reporting applications. Specifically, new end user reporting applications could possibly follow a completely different approach in data selection and presentation than in the traditional database reporting methods. However, there are currently no concepts, processes, or methods of data reporting that permit an end user to make full use of the possibilities offered by an in-memory architecture and column-store. An embodiment of this disclosure provides such a concept and method that empowers the capabilities of an in-memory database for an end user. While the use of the disclosed concept and method in connection with an in-memory database provides for potentially great and improved processing speeds, the use of the concept and method alone without an in-memory database (i.e., a traditional disc-based database) in and of itself results in an improved system and method of generating end user reports.

In an embodiment, a new end user data reporting process retrieves from the database only information that is actually relevant to the initial output of an end user report. It is therefore a precondition that fields contained in or desired to be contained in an end user report output are known. This concept or feature permits fast reporting and response times when using any database, including a traditional database on a disc, but offers even better response times when the database is an in-memory database, such as SAP's HANA database.

In an embodiment, input is received directly from an end user via an end user interface, and only the relevant data fields are read from the database (either a disc or an in-memory database). By reading only the relevant fields, this saves a great amount of processing time and resources. Moreover, for an in-memory embodiment, data aggregation can be done directly in the database. The selection of only the relevant data fields in combination with the aggregation results in less space being allocated for memory. Specifically, because of the aggregation, far less rows are actually transferred from the database. Additionally, for flexible reporting solutions, dynamic structures can also be used to reduce the number of columns in the reporting. This avoids the presence of a lot of empty fields per row. This all results in better response times and decreased memory consumption since the results can be delivered by the database much faster than ever before and only the relevant data is formatted and displayed.

In an embodiment, after an initial report is generated and displayed, an end user can indicate that he or she would like to change the subject of the displayed fields, such as by adding fields in the form of additional columns. These end user-requested changes can be used to trigger a selection of a set of new relevant data (and only the set of new relevant data). The new relevant data can then be immediately displayed in an updated end user report.

Figure 1B:
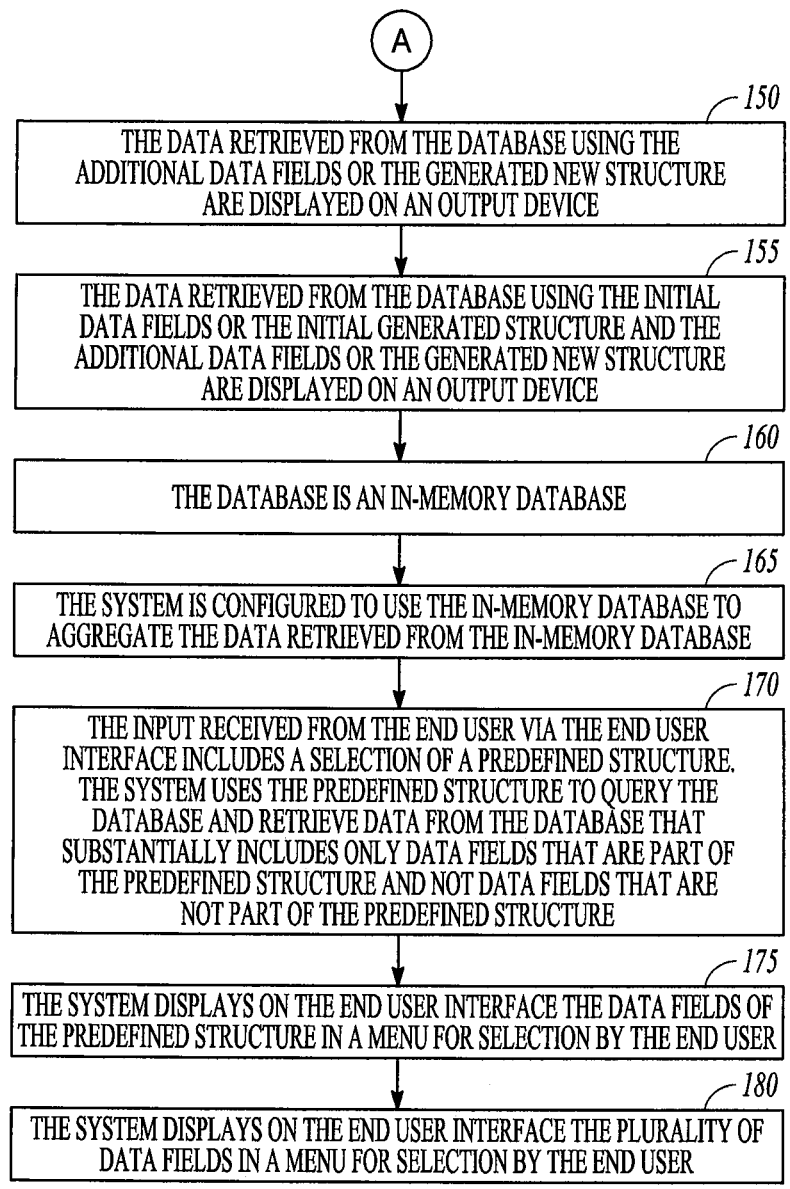

FIGS. 1A and 1B are a block diagram of the several features of a system and a process for layout driven data selection in end user data reporting. While FIGS. 1A and 1B are in the form of a flowchart-like diagram and includes a number of process blocks 105-180, which are arranged serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 1A and 1B, at 105, a database is maintained on a system. The database includes a plurality of records, and each record includes a plurality of data fields. At 110, input is received from an end user. An end user is the ultimate user of the database reporting software, that is, the person for whom the database reports are generated and the person who uses the database reports to make business decisions. The end user is not an information technology (IT) person who is technically well-adept at working with data in, retrieving data from, and manipulating data in the database using low level techniques and languages. The end user input is received from the end user via an end user interface. The end user input includes a subset of the plurality of data fields.

In an embodiment, at 115, a structure is generated that includes the subset of the plurality of data fields. In a further embodiment, the structure includes only the subset of data fields, and not for example the entire database record structure or all the columns in the database record. In this manner, memory resources are not allocated to column data that will not be read from the database. This structure is generated for the end user using the input of data fields selected by the end user. The result is that the end user can generate specific queries for the database, using only an end user interface, that is, without the assistance of an IT person. At 120, the database is queried using the generated structure, that is, the structure generated from the end user input. In another embodiment, a structure is not used, and the database is queried using simply the subset of the data fields. At 125, data is retrieved from the database using the structure generated from the end user input. In another embodiment, data is retrieved from the database using the subset of data fields. In an embodiment, the data retrieved from the database includes only data fields that are part of the subset of data fields or the generated structure. In another embodiment, the retrieved data from the database substantially or predominantly includes only the data fields that are part of the subset of data fields or the generated structure, but may also include a number of other fields such as one, two, or several additional fields that will not substantially affect the processing time or resource allocation of the system. These additional fields could be fields not specifically requested by an end user, but which serve some technical purpose within the system. The actual number of such additional fields is dependent on several factors such as the size of the database, the size of the report, and the hardware of the system. Therefore, in addition to not having to involve IT personnel to retrieve data of the end user's choice, the end user can select via the end user interface only the data that the end user wants, and only this data (or substantially only this data) will be retrieved. Consequently, in an embodiment, only the data in which the end user is interested is retrieved, processed, and displayed. This system and method save a good deal of system resources.

After the display of the data on the end user interface, the end user may decide to display additional data. This additional data may include some, all, or none of the initially displayed data. Specifically, as further illustrated in FIG. 1, at 130, additional input is received from the end user. The additional end user input is received via the end user interface, and includes additional data fields to be added to the subset that was initially chosen by the end user. In an embodiment, at 135, a new structure is generated for the end user that corresponds to the additional data fields entered by the end user. In another embodiment, a structure is not generated. At 140, the database is queried using the generated new structure. Alternatively, if a new structure was not generated, the database is queried with the additional data fields. At 145, data is retrieved from the database using the generated new structure (or simply the data fields). The data retrieved from the database using the generated new structure (or the data fields) includes only data fields that are part of the generated new structure (or the data fields). The retrieved data does not include data fields that are not part of the generated new structure (or the additional data fields selected by the end user). After retrieving this additional data, the system can generate a new end user report that includes some or all of both the initially generated data and the additionally generated data. At 150, the data retrieved from the database using the generated new structure (or the additional data fields) are displayed on an output device, and at 155, the data retrieved from the database using the generated structure (or the initially selected data fields) and the generated new structure (or the additionally selected data fields) are displayed on an output device. The output device could be the end user interface, or it could be an output device separate from the end user interface.

At 160, it is noted that the database could be an in-memory database. As noted above, an in-memory database, with its architecture that is resident in memory, provides very fast response times and decreases the amount of required memory. At 165, the system is configured to use the in-memory database to aggregate the data retrieved from the in-memory database.

At 170, the input received from the end user via the end user interface includes a selection of a predefined structure. The system uses the predefined structure to query the database and retrieve data from the database that substantially includes only data fields that are part of the predefined structure and not data fields that are not part of the predefined structure. That is, in an embodiment, several additional data fields could be included. At 175, the system displays on the end user interface the data fields of the predefined structure in a menu for selection by the end user. At 180, the system displays on the end user interface the plurality of data fields in a menu for selection by the end user.

Figure 2:
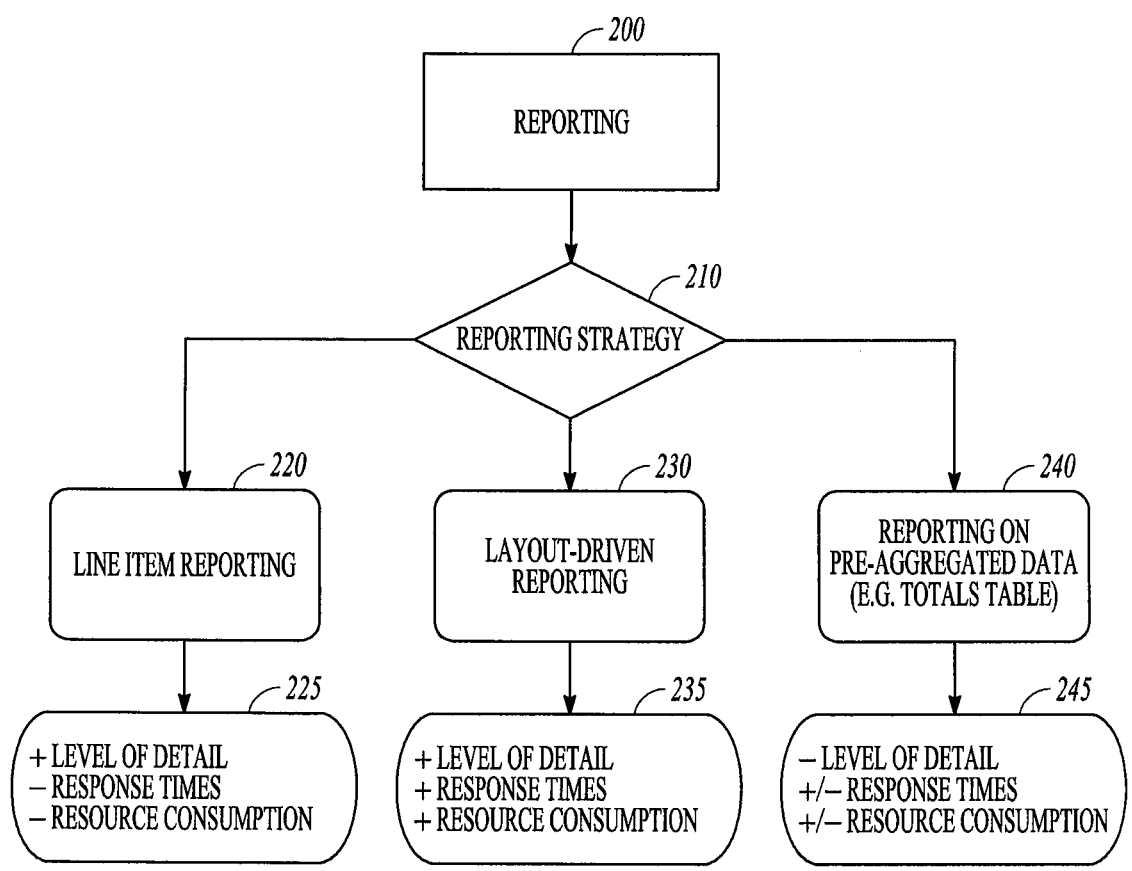
FIG. 2 is a diagram of an end user reporting system having several reporting strategies.

FIG. 2 is a diagram of a reporting system 200 having several reporting strategies 210. FIG. 2 illustrates some differences among the reporting strategies of line item detail reporting, aggregated data reporting, and an embodiment of layout driven reporting (in which only the data that is desired to be actually displayed to an end user is read from the database). In traditional line item reporting 220, it is illustrated at 225 that while there is a very high level of detail, there is also slow response times and a large consumption of resources (such as processor cycles and RAM). In some systems, this large consumption of resources can lead to exceeding the level of resources of the system. In reporting on aggregated/pre-aggregated data (e.g., a totals table) as shown at 240/245, there is a decreased level of detail, and while there are improved response times and decreased resource consumption as compared to the line item reporting of 220, the response time and memory conservation are still not as good as the layout reporting 230. Moreover, depending on the design of the aggregates, memory and processing resources of the system may still be exceeded. And if the aggregated data reports that are available to an end user are not quite what the end user desires or needs, then such requests cannot be fulfilled without the assistance of IT personnel. As illustrated at 235, the layout reporting provides a high level of detail, excellent response times, and the use of only the amount of resources that are required for a particular report (i.e., no wasting of memory or other resources).

FIGS. 3, 4, and 5 illustrate further the differences among line item reporting 220, layout driven reporting 230, and aggregated/pre-aggregated reporting 240. FIG. 3 illustrates an example of a report 300, which could be generated by either line item reporting, layout driven reporting, or aggregated reporting. As illustrated in FIG. 3, for the year 2011 and a ledger identified as 0L, a plurality of company codes 330, the accounts 340 for each of the listed companies, the currency 350 in which the account is listed, and the amount 360 that is in the account are reported. While such a report could be generated by line item reporting, aggregate reporting, or layout driven reporting, a layout driven reporting system will produce the reports much more efficiently and quickly. Section 370 of the report illustrates several predefined layouts that can be used to generate a predefined report.

FIG. 4 illustrates a report 400 that is generated by an end user selecting a predefined layout relating to a particular period 410. This generates the additional period column 420 in the report. FIG. 5 illustrates the feature of layout driven reporting wherein an end user can select one or more additional data fields (columns), and immediately generate an updated report that includes the end user-selected additional data fields or columns. As illustrated in FIG. 5, the columns that are presently displayed in a report are listed at 510, and all the columns that are available for display are listed at 520. As further illustrated in FIG. 5, an end user has selected the additional data fields of profit center 530 and LC Ar 540, which are now generated on the report shown in FIG. 5.

Figure 6:
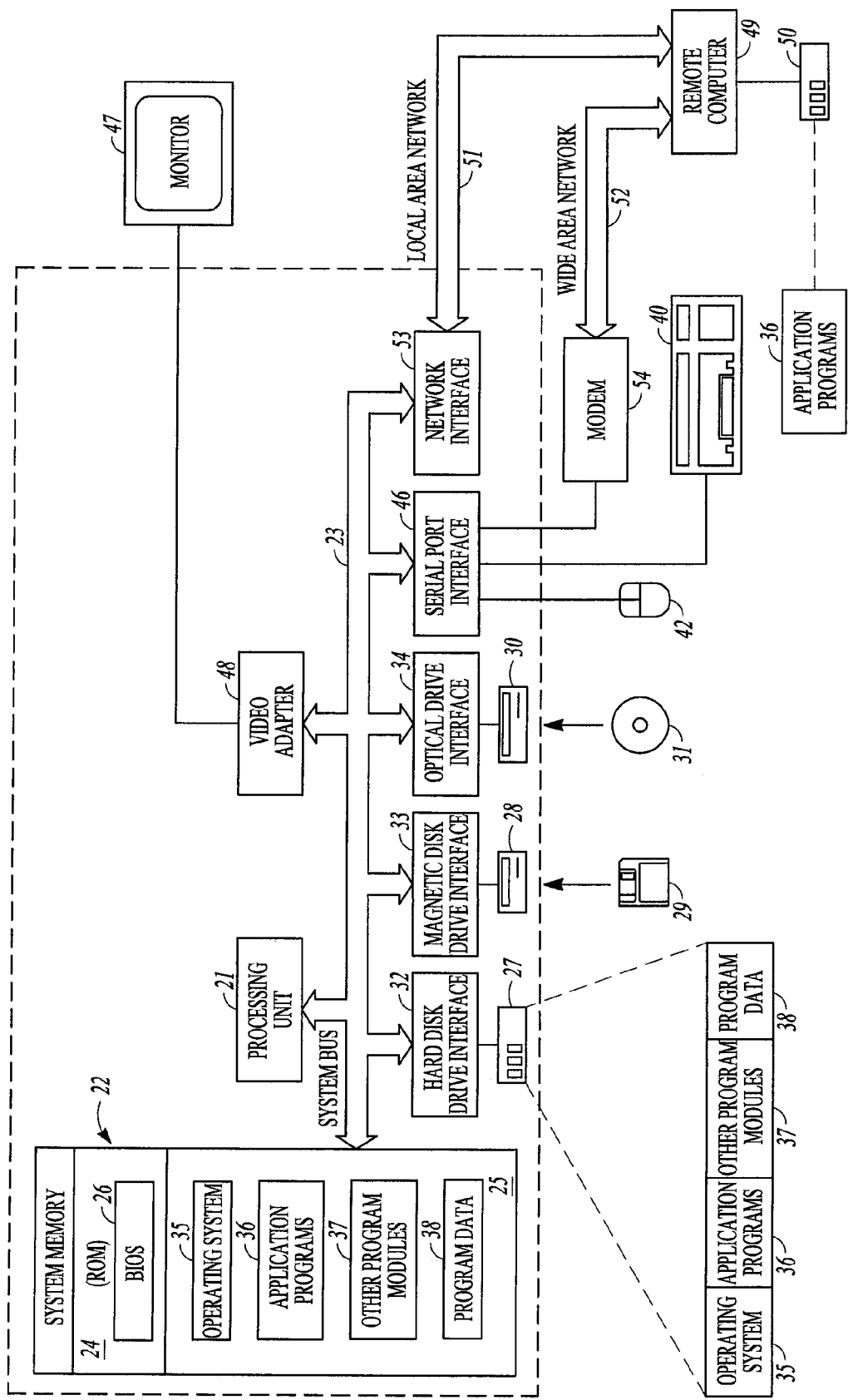
FIG. 6 is a block diagram of an example embodiment of a computer processor system upon which one or more embodiments of the present disclosure can execute.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer. The system memory 22 can include an in-memory database.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Example Embodiments

Several embodiments and sub-embodiments have been disclosed above, and it is envisioned that any embodiment can be combined with any other embodiment or sub-embodiment. Specific examples of such combinations are illustrated in the examples below.

Example No. 1 is a system including at least one of a computer processor and a computer storage device configured to maintain a database comprising a plurality of records, each record comprising a plurality of data fields; receive input from an end user, the end user input received via an end user interface and the end user input comprising a subset of the plurality of data fields; query the database using the subset of data fields; and retrieve data from the database using the subset of data fields, the data retrieved from the database substantially comprising only data fields that are part of the subset of data fields.

Example No. 2 includes the features of Example No. 1, and optionally includes a system wherein the computer processor is configured to display the retrieved data on an output device.

Example No. 3 includes the features of Example Nos. 1-2, and optionally includes a system wherein the output device comprises the end user interface.

Example No. 4 includes the features of Example Nos. 1-3, and optionally includes a system wherein the database comprises an in-memory database.

Example No. 5 includes the features of Example Nos. 1-4, and optionally includes a system wherein the computer processor is configured to aggregate the data retrieved from the in-memory database.

Example No. 6 includes the features of Example Nos. 1-5, and optionally includes a system wherein the computer processor and the computer storage device are configured to receive additional input from the end user, the additional end user input comprising additional data fields to be added to the subset; query the database using the additional data fields; and retrieve data from the database using the additional data fields, the data retrieved from the database using the additional data fields substantially comprising only data fields that are part of the additional data fields.

Example No. 7 includes the features of Example Nos. 1-6, and optionally includes a system wherein the computer processor is configured to generate a structure that corresponds to the additional data fields and to use the structure to retrieve the additional data fields from the database.

Example No. 8 includes the features of Example Nos. 1-7, and optionally includes a system wherein the computer processor is configured to display on an output device the data retrieved from the database using the additional data fields.

Example No. 9 includes the features of Example Nos. 1-8, and optionally includes a system wherein the computer processor is configured to display on an output device the data retrieved from the database using the data fields received from the user and the additional data fields received from the user.

Example No. 10 includes the features of Example Nos. 1-9, and optionally includes a system wherein the input received from the end user via the end user interface comprises a selection of a predefined set of data fields, and wherein the computer processor is configured to use the predefined set of data fields to query the database and retrieve data from the database substantially comprising only data fields that are part of the predefined set of data fields.

Example No. 11 includes the features of Example Nos. 1-10, and optionally includes a system wherein the computer processor is configured to display on the end user interface the predefined set of data fields in a menu for selection by the end user.

Example No. 12 includes the features of Example Nos. 1-11, and optionally includes a system wherein the computer processor is configured to display on the end user interface the plurality of data fields in a menu for selection by the end user.

Example No. 13 includes the features of Example Nos. 1-12, and optionally includes a system wherein the retrieved data from the database using the subset of data fields comprises only data fields that are part of the subset of data fields and wherein the retrieved data from the database using the subset of data fields does not comprise data fields that are not part of the subset of data fields.

Example No. 14 includes the features of Example Nos. 1-13, and optionally includes a system wherein the retrieved data from the database using the subset of data fields comprises data fields that are part of the subset of data fields, and comprises a minimal number of additional data fields that are not part of the subset of data fields.

Example No. 15 includes the features of Example Nos. 1-14, and optionally includes a system wherein the computer processor is configured to generate a structure comprising the subset of data fields and to use the structure to query the database.

Example No. 16 is a process comprising maintaining a database comprising a plurality of records, each record comprising a plurality of data fields; receiving at a computer processor input from an end user, the end user input received via an end user interface and the end user input comprising a subset of the plurality of data fields; querying the database using the computer processor and the subset of data fields; and retrieving data from the database using the computer processor and the subset of data fields, the data retrieved from the database substantially comprising only data fields that are part of the subset of data fields.

Example No. 17 includes all the features of Example No. 16, and optionally includes receiving additional input from the end user, the additional end user input comprising additional data fields to be added to the subset; querying the database using the additional data fields; and retrieving data from the database using the additional data fields, the data retrieved from the database using the additional data fields substantially comprising only data fields that are part of the additional data fields.

Example No. 18 includes the features of Example Nos. 16-17, and optionally includes a process wherein the input received from the end user via the end user interface comprises a selection of a predefined set of data fields, and comprising using the computer processor and the predefined set of data fields for querying the database and retrieving data from the database substantially comprising only data fields that are part of the predefined set of data fields.

Example No. 19 includes the features of Example Nos. 16-18, and optionally includes a process wherein the retrieved data from the database using the subset of data fields comprises only data fields that are part of the subset of data fields and wherein the retrieved data from the database using the subset of data fields does not comprise data fields that are not part of the subset of data fields.

Example No. 20 includes the features of Example Nos. 16-19, and optionally includes a process wherein the retrieved data from the database using the subset of data fields comprises data fields that are part of the subset of data fields, and comprises a minimal number of additional data fields that are not part of the subset of data fields.

Example No. 21 is a computer readable storage device comprising instructions that when executed by a processor execute a process comprising maintaining a database comprising a plurality of records, each record comprising a plurality of data fields; receiving at a computer processor input from an end user, the end user input received via an end user interface and the end user input comprising a subset of the plurality of data fields; querying the database using the computer processor and the subset of data fields; and retrieving data from the database using the computer processor and the subset of data fields, the data retrieved from the database substantially comprising only data fields that are part of the subset of data fields.

Example No. 22 includes the features of Example No. 21, and optionally includes a computer readable storage device comprising instructions for receiving additional input from the end user, the additional end user input comprising additional data fields to be added to the subset; querying the database using the additional data fields; and retrieving data from the database using the additional data fields, the data retrieved from the database using the additional data fields substantially comprising only data fields that are part of the additional data fields.

Example No. 23 includes the features of Example Nos. 21-22, and optionally includes a computer readable storage device wherein the input received from the end user via the end user interface comprises a selection of a predefined set of data fields, and comprising instructions for querying the database and retrieving data from the database substantially comprising only data fields that are part of the predefined set of data fields.

Example No. 24 includes the features of Example Nos. 21-23, and optionally includes a computer readable storage device wherein the retrieved data from the database using the subset of data fields comprises only data fields that are part of the subset of data fields and wherein the retrieved data from the database using the subset of data fields does not comprise data fields that are not part of the subset of data fields.

Example No. 25 includes the features of Example Nos. 21-24, and optionally includes a computer readable storage device wherein the retrieved data from the database using the subset of data fields comprises data fields that are part of the subset of data fields, and comprises a minimal number of additional data fields that are not part of the subset of data fields.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
at least one of, a memory, a computer processor hardware and a computer storage device configured to:
maintain a database comprising a plurality of records, each record comprising a plurality of data fields;
receive input from an end user, the end user input received via an end user interface and the end user input comprising a subset of the plurality of data fields;
query the database using the subset of data fields; and
retrieve data from the database using the subset of data fields, the data retrieved from the database comprising only data fields that are part of the subset of data fields;
wherein the input received from the end user via the end user interface comprises a selection of a predefined set of data fields, and wherein the computer processor hardware is configured to use the predefined set of data fields to query the database and retrieve data from the database comprising only data fields that are part of the predefined set of data fields; and wherein the retrieved data from the database using the subset of data fields does not comprise data fields that are not part of the subset of data fields.

2. The system of claim 1, wherein the computer processor hardware is configured to display the retrieved data on an output device.

3. The system of claim 2, wherein the output device comprises the end user interface.

4. The system of claim 1, wherein the database comprises an in-memory database.

5. The system of claim 4, wherein the computer processor hardware is configured to aggregate the data retrieved from the in-memory database.

6. The system of claim 1, wherein the computer processor hardware and the computer storage device are configured to:
receive additional input from the end user, the additional end user input comprising additional data fields to be added to the subset;
query the database using the additional data fields; and
retrieve data from the database using the additional data fields, the data retrieved from the database using the additional data fields substantially comprising only data fields that are part of the additional data fields.

7. The system of claim 6, wherein the computer processor hardware is configured to generate a structure that corresponds to the additional data fields and to use the structure to retrieve the additional data fields from the database.

8. The system of claim 6, wherein the computer processor hardware is configured to display on an output device the data retrieved from the database using the additional data fields.

9. The system of claim 6, wherein the computer processor hardware is configured to display on an output device the data retrieved from the database using the data fields received from the user and the additional data fields received from the user.

10. The system of claim 1, wherein the computer processor hardware is configured to display on the end user interface the predefined set of data, fields in a menu for selection by the end user.

11. The system of claim 1, wherein the computer processor hardware is configured to display on the end user interface the plurality of data fields in a menu for selection by the end user.

12. The system of claim 1, wherein the retrieved data, from the database using the subset of data fields comprises data fields that are part of the subset of data fields, and comprises a number of additional data, fields that are not part of the subset of data fields.

13. The system of claim 1, wherein the computer processor hardware is configured to generate a structure comprising the subset of data fields and to use the structure to query the database.

14. A process comprising:
maintaining a database comprising a plurality of records, each record comprising a plurality of data, fields;
receiving at a computer processor hardware input from an end user, the end user input received via an end user interface and the end user input comprising a subset of the plurality of data fields;
querying the database using the computer processor hardware and the subset of data fields; and
retrieving data from the database using the computer processor hardware and the subset of data fields, the data retrieved from the database comprising only data, fields that are part of the subset of data fields;
wherein the input received from the end user via the end user interface comprises a selection of a predefined set of data fields, and wherein the computer processor hardware is configured to use the predefined set of data fields to query the database and retrieve data from the database comprising only data fields that are part of the predefined set of data fields; and
wherein the retrieved data from the database using the subset of data fields does not comprise data fields that are not part of the subset of data fields.

15. The process of claim 14, comprising:
receiving additional input from the end user, the additional end user input comprising additional data fields to be added to the subset;
querying the database using the additional data fields; and
retrieving data from the database using the additional data fields, the data retrieved from the database using the additional data fields substantially comprising only data fields that are part of the additional data fields.

16. The process of claim 14, wherein the retrieved data from the database using the subset of data fields comprises data fields that are part of the subset of data fields, and comprises a minimal number of additional data fields that are not part of the subset of data fields.

17. A non-transitory computer readable storage device comprising instructions that when executed by a processor execute a process comprising:
maintaining a database comprising a plurality, of records, each record comprising a plurality of data fields;
receiving at a computer processor hardware input from an end user, the end user input received via an end user interface and the end user input comprising a subset of the plurality of data fields;
querying the database using the computer processor hardware and the subset of data fields; and
retrieving data from the database using the computer processor hardware and the subset of data fields, the data retrieved from the database comprising only data fields that are part of the subset of data fields;
wherein the input received from the end user via the end user interface comprises a selection of a predefined set of data fields, and wherein the computer processor hardware is configured to use the predefined set of data fields to query the database and retrieve data from the database comprising only data fields that are part of the predefined set of data fields; and
wherein the retrieved data from the database using the subset of data fields does not comprise data fields that are not part of the subset of data fields.

18. The non-transitory computer readable storage device of claim 17, comprising instructions for:
receiving additional input from the end user, the additional end user input comprising additional data fields to be added to the subset;
querying the database using the additional data fields; and
retrieving data, from the database using the additional data fields, the data, retrieved from the database using the additional data fields substantially comprising only data fields that are part & the additional data fields.

19. The non-transitory computer readable storage device of claim 17, wherein the retrieved data from the database using the subset of data fields comprises data fields that are part of the subset of data fields, and comprises a minimal number of additional data fields that are not part of the subset of data fields.

* * * * *